United States Patent
Tobias Granado

(10) Patent No.: US 10,561,153 B2
(45) Date of Patent: Feb. 18, 2020

(54) FOWL POSITIONING SYSTEM AND METHOD OF POSITIONING FOWL

(71) Applicant: Diseño Y Construcción De Maquinaria Automatizada, SL, Valencia (ES)

(72) Inventor: Jose Antonio Tobias Granado, Valencia (ES)

(73) Assignee: Diseño Y Construcción De Maquinaria Automatizada, Sl, Valencia (ES)

( * ) Notice: Subject to any disclaimer, the term of this patent is extended or adjusted under 35 U.S.C. 154(b) by 0 days.

(21) Appl. No.: 16/231,849

(22) Filed: Dec. 24, 2018

(65) Prior Publication Data
US 2019/0200626 A1    Jul. 4, 2019

(30) Foreign Application Priority Data
Dec. 29, 2017    (WO) ................ PCT/ES2017/070868

(51) Int. Cl.
A22C 21/00    (2006.01)
(52) U.S. Cl.
CPC ............................. A22C 21/0053 (2013.01)
(58) Field of Classification Search
CPC .. A22C 21/00; A22C 21/0038; A22C 21/0053
USPC ....... 452/177–180, 182, 183, 184, 198, 149, 452/151, 155, 166, 169, 170
See application file for complete search history.

(56) References Cited

U.S. PATENT DOCUMENTS 7,285,040 B2 * 10/2007 Ilch ...................... A22B 5/0029
                                                           452/150
7,404,759 B2 *  7/2008 Sato ..................... A22B 5/0041
                                                           452/157

(Continued)

FOREIGN PATENT DOCUMENTS

EP    2263468 A2    12/2010
EP    2471373 A1     7/2012

(Continued)

OTHER PUBLICATIONS

WIPO, International Search Report, dated Sep. 4, 2018, in International Application No. PCT/ES2017/070868, filed Dec. 29, 2017.

(Continued)

*Primary Examiner* — Richard T Price, Jr.
(74) *Attorney, Agent, or Firm* — Thedford I. Hitaffer; Hitaffer & Hitaffer, PLLC

(57) ABSTRACT

Fowl positioning system, comprising a dosing belt, arranged to receive randomly oriented slaughtered fowl and dose them one by one on a conveyor belt linked to a computer vision system, the belt being arranged to sequentially position the fowl under the computer vision system in order to determine the placement in which each fowl is found on said conveyor belt, and a robotic arm with a gripper on the end, arranged to sequentially grasp each fowl from the conveyor belt and thread them one by one in a predefined position on one of the supports located in a fowl processing line, the robotic arm being linked to the computer vision system such that it determines the position for the gripper to clamp and release the fowl.

15 Claims, 5 Drawing Sheets

(56) References Cited

U.S. PATENT DOCUMENTS

| | | | | |
|---|---|---|---|---|
| 7,476,150 B2* | 1/2009 | Ilch | ...................... | A22C 17/006 |
| | | | | 452/198 |
| 8,092,283 B2* | 1/2012 | Hansen | .................. | A22C 25/08 |
| | | | | 452/121 |
| 8,257,154 B2* | 9/2012 | Seaton | .................. | A22C 17/004 |
| | | | | 452/149 |
| 8,328,605 B2 | 12/2012 | McMurray et al. | | |
| 8,366,522 B2* | 2/2013 | Wally | ................... | A22C 15/001 |
| | | | | 452/32 |
| 8,708,782 B2* | 4/2014 | Kessler | ................ | A22C 15/001 |
| | | | | 452/51 |
| 8,992,290 B2* | 3/2015 | Taniguchi | ............ | A22C 17/004 |
| | | | | 452/135 |

FOREIGN PATENT DOCUMENTS

| | | |
|---|---|---|
| EP | 2591679 A1 | 5/2013 |
| GB | 2415944 A | 1/2006 |

OTHER PUBLICATIONS

WIPO, Written Opinion, dated Sep. 4, 2018, in International Application No. PCT/ES2017/070868, filed Dec. 29, 2017.

\* cited by examiner

FOWL POSITIONING SYSTEM AND METHOD OF POSITIONING FOWL

This application claims priority to International Application No. PCT/ES2017/070868, filed Dec. 29, 2017, the disclosure of which is incorporated herein by reference.

OBJECT OF THE INVENTION

The present invention patent application aims to register a positioning system for fowl slaughtered for food and a method of positioning, which incorporates notable innovations and advantages compared to the techniques used until now, particularly convenient for placing fowl in process lines with supports.

More specifically, the invention proposes the development of a fowl positioning system, which due to the particular arrangement thereof is compact, sanitary, robust and reliable when used, as well as economical to manufacture and maintain.

BACKGROUND OF THE INVENTION

The United States and Brazil are two of the main producers of chicken and turkey meat in the world. In the slaughterhouses of these countries, unlike in Europe, the cutting and deboning processes in the production lines are very manual, mainly because the end use of the meat is different from that in Europe. The meat in these countries is mainly consumed after being processed. in other words, minced, in the form of hamburgers, meatballs, etc. Thus, it is very important to be able to obtain as much meat as possible from each fowl. For this reason, cutting and deboning tasks are carried out manually. In the US there are currently more than 800 lines with these characteristics, and more than 500 in Brazil.

These cutting and deboning lines are structured in production chains in which the workers cut and debone the fowl around support lines with a conical tip on which they are loaded. The loading of the fowl on the support is one of the most monotonous steps, which provides little value; neither does it produce any advantage when it comes to obtaining as much meat as possible from each piece.

On the other hand, there are many problems related to the health of the workers associated with continuous repetitive movements such as those required for threading the fowl on the support. Performing the same movement all day with a sustained rhythm can create problems in the joints and the muscles, as well as psychological problems. The poultry industry is interested in reducing said manual labor for many reasons, including worker safety.

Currently, research is being performed on actuators capable of handling fowl. Robotic systems are known in the current state of the art with fowl positioning elements, with computer vision systems that help it to know the orientation thereof and place them in processing chains, such as the one disclosed in patent document U.S. Pat. No. 8,328,605, but the implementation of said system in a plant for manually processing the whole fowl on supports is not effective.

Therefore, there is still a need for a system that enables the loading operator in the support lines to be substituted, capable of moving a set of fowl initially provided in an unknown position to a position suitable for the manual processing thereof in said lines, which is compact, hygienic, robust and reliable in use, and economical to manufacture and maintain.

DESCRIPTION OF THE INVENTION

The present invention was developed with the aim of providing a fowl positioning system and a method of positioning that is configured as a novelty within the field of application and that encompasses the previously mentioned requirements.

The fowl positioning system object of the present invention initially comprises a dosing belt with dividing panels by way of buckets, optionally covered in the intermediate section thereof, arranged to receive randomly oriented slaughtered fowl and dose them one by one onto a conveyor belt through a hopper or ramp located at the end of the dosing belt.

The conveyor belt comprises, in one section of the path thereof, a computer vision system, which is usually made up of a camera linked to a computer with an image-processing program, and is which is able to determine the placement of each fowl transported on said belt.

The main novelty of the present fowl positioning system is a robotic arm with a clamping gripper on the end, arranged in order to sequentially grasp each fowl provided by the conveyor belt and thread them one by one in a predefined position that is respectively on one of the supports located in a fowl processing line. The robotic arm is linked with the computer vision system such that it calculates and establishes the position for the gripper to clamp and release the fowl and the path of the robotic arm until the fowl is threaded on the support.

A preferred embodiment of the gripper of the robotic arm comprises a structure made up of pairs of claws curved into arch shapes, capable of being actuated and symmetrically arranged such that the ends of the claws come into contact with those of the other half of the pair when the gripper is in a closed position.

The conveyor belt, at the beginning of the path, can comprise elements that help to move forward and/or orient the fowl. A possible embodiment consists of two strings of vertical rollers located on both sides of the conveyor belt, in the fowl receiving area thereof, which are operated by electric motors in order to actuate the rotation thereof and aid in the forward movement and/or orientation of the fowl recently dumped on the belt. Another possible alternative embodiment consists of metal tiling located beneath the conveyor belt in the fowl reception area thereof. The tiling makes the belt acquire a semi-cone shape with the aim of carrying out a first positioning of the chicken, placing the parallel column thereof in the advance direction of the belt, and thus facilitating the detection of the orientation of the fowl by the computer vision system.

With respect to the end of the path thereof, the belt can comprise elements that aid in the clamping of the fowl by the robotic arm or that return the fowl to the beginning of the path if the position of the fowl is not valid for suitable clamping by the robotic arm. A possible embodiment consists of an ejection system comprising an actuator joined to a panel, linked to the computer vision system such that when it detects that the fowl is not in a suitable position to be clamped by the robotic arm, the panel pushes the fowl in order to eject it from the conveyor belt, either to a vessel or back to the dosing belt. Another possible alternative embodiment is made up of two other conveyor belts that can be tilted, placed side by side, both arranged after the conveyor belt and with the same advance direction thereof, with the particularity that they comprise at least one actuator linked to the computer vision system and arranged in order to tilt the belts with respect to an axis parallel to the advance direction of the belts, such that they can turn the fowl to one side or the other and thus facilitate clamping by the gripper. As a preferred characteristic, each belt that can be tilted can comprise independent actuators, whereas the rotation axes of the belts can be the sides adjacent to each other, being able to coincide with the plane of symmetry of the initial conveyor belt. In combination with this last embodiment, the system can comprise at least one roller cradle, which sequentially receives the fowl from the conveyor belt or from the belts that be be tilted, the separation of which between rollers is greater than the thickness of the claws, and at the same time said separation coincides with the separation between the pairs of claws, such that said claws can intersect with the rollers and grasp the fowl, by contacting it from the lower contour thereof. This arrangement of the gripper in conjunction with the roller cradle enables the fowl to be clamped firmly but without producing permanent deformations in them. In a preferred embodiment, the system comprises two roller cradles, each one tilting together towards one of the two belts that can be tilted, such that the fowl continues in the position facilitated by these when being clamped by the claw-shaped gripper.

The components of the positioning system are preferably designed from materials approved by the US Food and Drug Association (FDA) and by the US Department of Agriculture (USDA), while carrying out the design guidelines thereof.

Thanks to this system, slaughtered fowl, of different sizes, shapes and weights, received in a random variety of positions, are positioned in a uniform and repetitive manner on the supports of a processing station. This advantage simplifies and makes it easier for workers to subsequently process the fowl manually.

The method of positioning fowl object of the present invention comprises the following steps:
  Supplying slaughtered fowl to a dosing belt
  Dosing the fowl one by one by the dosing belt to a conveyor belt
  Capturing the position of the fowl on the conveyor belt with a computer vision system
  Optionally, it can comprise a step of accepting or rejecting the fowl based on the captured position of the fowl, or a reorienting step
  Clamping and threading the fowl on a support by a robotic arm.

Other characteristics and advantages of the fowl positioning system and the method of positioning, object of the present invention, will become clear in light of the description of a preferred, though non-exclusive, embodiment, which, by way of a non-limiting example, is illustrated in the accompanying drawings.

DESCRIPTION OF A PREFERRED EMBODIMENT

In view of the aforementioned figures and, in accordance with the numbering adopted, an example of a preferred embodiment of the invention can be observed therein, which comprises the parts and elements indicated and described in detail below.

Figure 1:
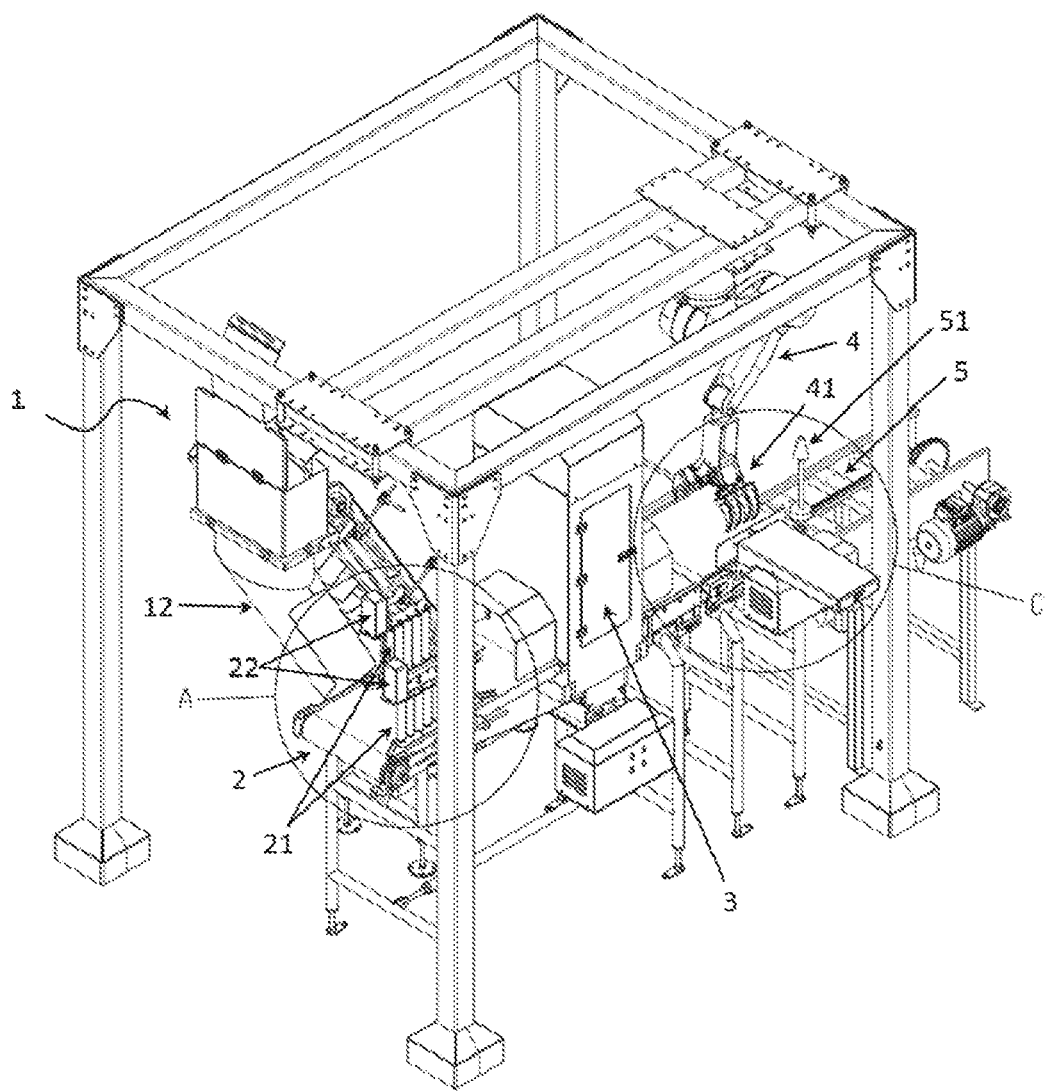
FIG. 1 shows a perspective view of the fowl positioning system.
Figure 2:
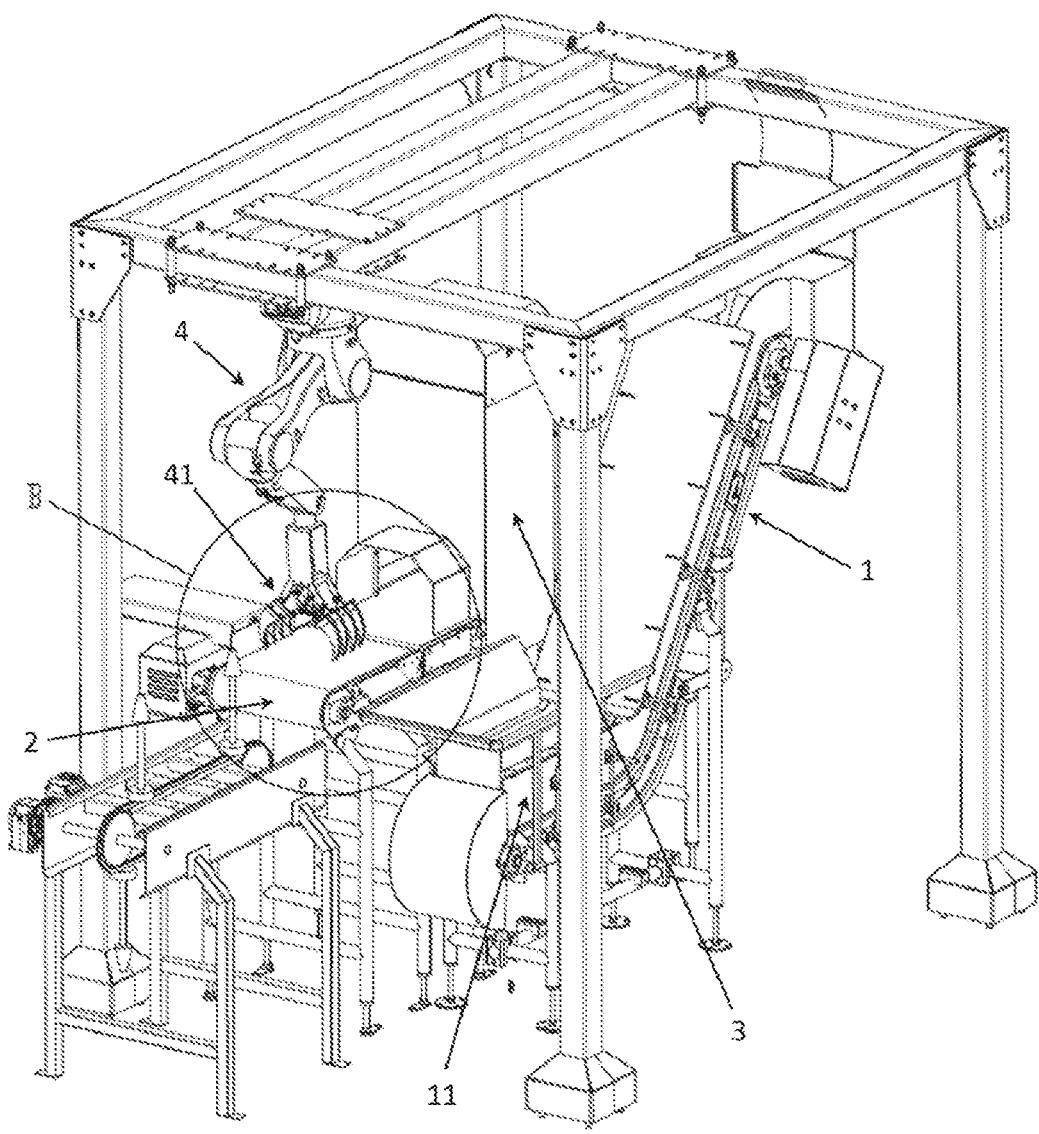
FIG. 2 shows a perspective view of the fowl positioning system from another angle.

As seen in FIG. 1 and FIG. 2, the present invention is made up of a dosing belt (1) with dividing panels, which receives the randomly oriented fowl in the lower area thereof (11) and doses them one by one on a conveyor belt (2) through a ramp (12). The belt (2) contains a computer vision system (3) in the path thereof that determines the exact placement of each fowl, and a robotic arm (4) with a clamping gripper (41) on the end, arranged in order to grip each fowl sequentially and thread them one by one on one of the supports (51) with a conical tip located in a processing line (5) in a predefined position. The robotic arm (4) is linked with the computer vision system (3) such that it calculates and establishes the position for the gripper (41) to clamp and release the fowl, and the path of the robotic arm (4) until the fowl is threaded on the support (51).

Figure 3:
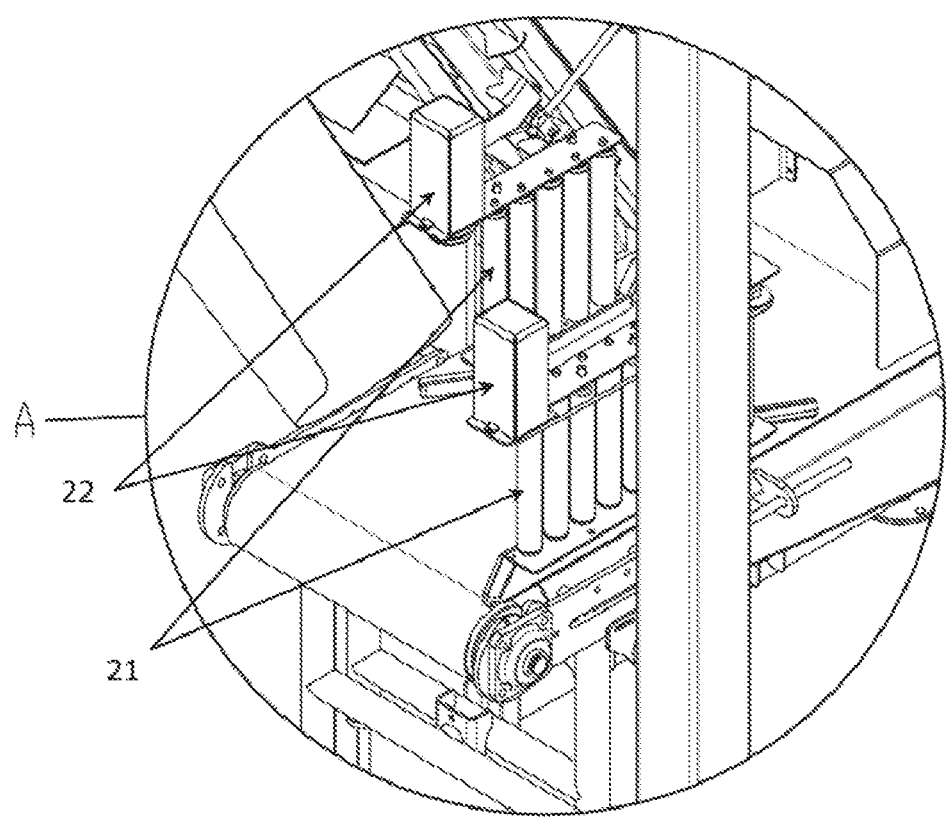
FIG. 3 shows an enlarged view of a section of FIG. 1.

As seen in the enlarged view shown in FIG. 3, in this preferred embodiment, the conveyor belt (2) comprises two strings of vertical rollers (21) located on both sides of the conveyor belt, in the fowl receiving area thereof, which are operated by electric motors (22) for actuating the rotation thereof and helping in the forward movement and/or orientation of the fowl recently dumped on the belt (2).

Figure 4:
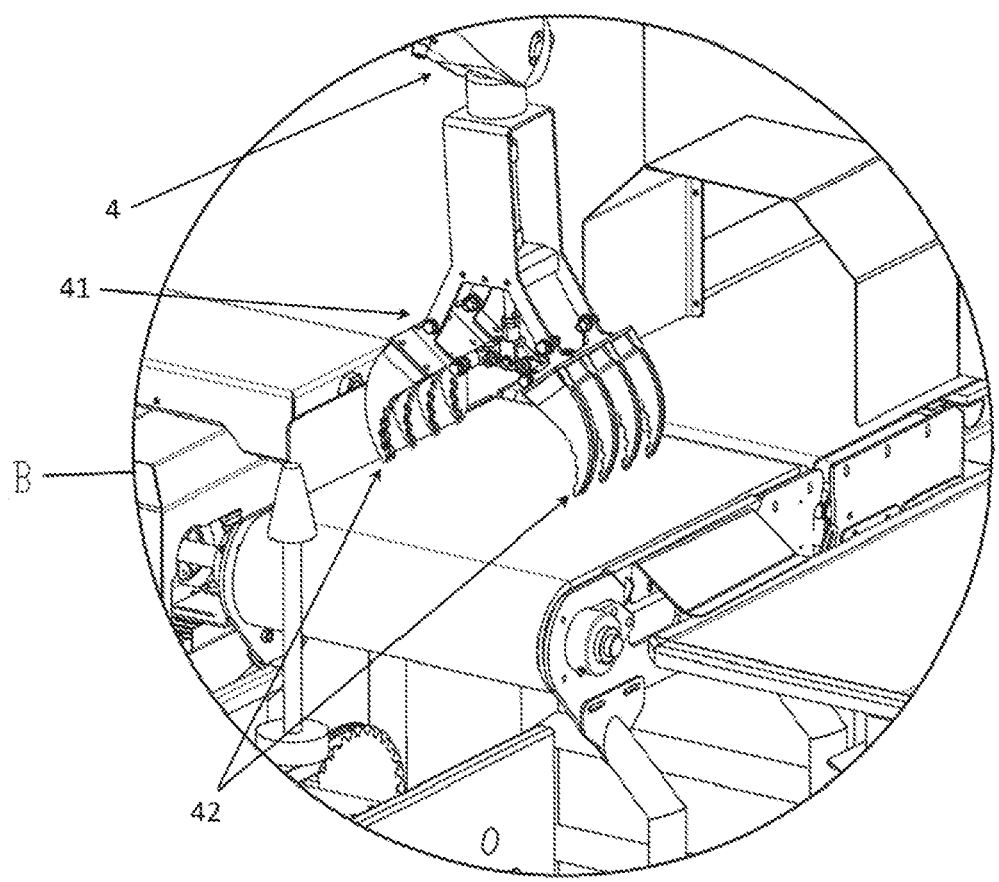
FIG. 4 shows an enlarged view of another section of FIG. 1.

As seen in FIG. 4, in this preferred embodiment of the system, the gripper (41) of the robotic arm (4) comprises a structure made up of pairs of claws (42) curved into arch shapes, capable of being actuated and symmetrically arranged, such that the ends of the claws (42) come into contact with those of the other half of the pair when the gripper (41) is in a closed position.

Figure 5:
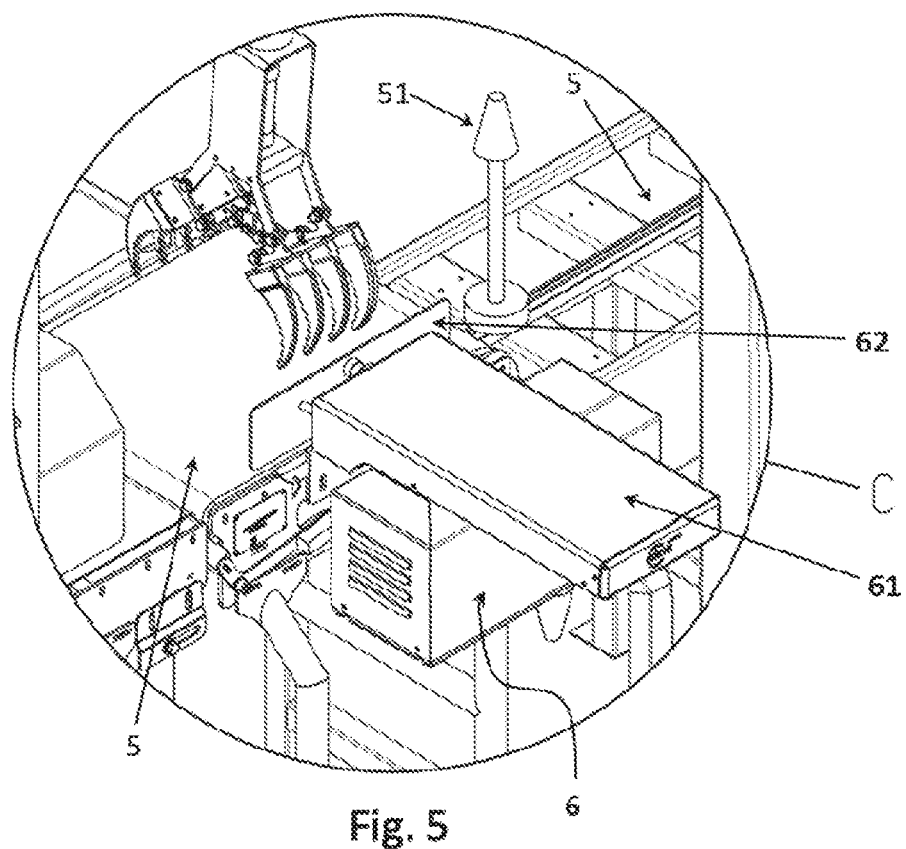
FIG. 5 shows an enlarged view of a section of FIG. 2.

In this embodiment, as seen in the enlarged view shown in FIG. 5, the conveyor belt (2) comprises an ejection system (6), located in the area where the fowl is clamped by the arm (4), made up of an actuator (61) joined to a panel (62) and linked to the computer vision system (3), such that when it detects that the fowl is in not in a suitable position for clamping by the robotic arm (4), the panel (62) pushes the fowl in order to eject it from the conveyor belt (2) back to the dosing belt (1).

The details, shapes, dimensions and other accessory elements, as well as the materials used to manufacture the fowl positioning system of the invention, may be suitably substituted for others which are technically equivalent, and do not diverge from the essential nature of the invention, nor the scope defined by the claims included below.

The invention claimed is:
1. A fowl positioning system, comprising:
  a) a dosing belt arranged to receive randomly oriented slaughtered fowl and dose them one by one on
  b) a conveyor belt linked to a computer vision system, the belt being arranged to sequentially position the fowl under the computer vision system in order to determine the placement in which each fowl is found on said conveyor belt,
  c) a robotic arm with a gripper on the end, arranged to sequentially grasp each fowl from the conveyor belt and thread them one by one in a predefined position on one of the supports located in a fowl processing line, the robotic arm being linked to the computer vision system such that said vision system determines the position for the gripper to clamp and release the fowl and the path of the robotic arm until the fowl is threaded on the support.

2. The system according to claim 1, further comprising metal tiling located beneath the conveyor belt in order to give it a semi-cone shape.

3. The system according to claim 1, further comprising two strings of vertical rollers located on both sides of the conveyor belt, in the fowl receiving area thereof, which are operated by electric motors to actuate the rotation thereof.

4. The system according to claim 1, further comprising two conveyor belts that can be tilted, placed side by side, both arranged after the mentioned conveyor belt and with the same advance direction thereof, comprising at least one actuator linked to the computer vision system and arranged to tilt the belts that can be tilted with respect to an axis parallel to the advance direction of the belts.

5. The system according to claim 4, wherein each belt that can be tilted comprises an independent actuator.

6. The system according to claim 5, wherein the rotation axes of the belts that can be tilted are the sides adjacent to each other.

7. The system according to claim 6, wherein the rotation axes of the belts that can be tilted coincide with the plane of symmetry of the conveyor belt.

8. The system according to claim 1, further comprising a roller cradle located after the conveyor belt.

9. The system according to claim 1, further comprising two roller cradles located after the belts that can be tilted and that are tilted together with these.

10. The system according to claim 1, wherein the gripper of the robotic arm comprises a structure made up of pairs of claws curved into arch shapes, capable of being actuated and symmetrically arranged, such that the ends of the claws come into contact with those of the other half of the pair when the gripper is in a closed position.

11. The system according to claim 10, wherein a separation between rollers is greater than the thickness of the claws, and at the same time said separation coincides with the separation between the pairs of claws.

12. The system according to claim 1, further comprising an ejection system made up of an actuator on the rod of which a panel is joined, said actuator being linked to the computer vision system, such that when it detects that the fowl is not in a suitable position for clamping by the robotic arm, the actuator is actuated and the panel pushes the fowl in order to eject it from the conveyor belt, either to a vessel or back to the dosing belt.

13. A method of positioning fowl, comprising the following steps:
   a) supplying slaughtered fowl to a dosing belt,
   b) dosing the fowl one by one by the dosing belt to a conveyor belt,
   c) capturing the position of the fowl on the conveyor belt by a computer vision system, and
   d) clamping and threading the fowl on a support by a robotic arm.

14. The method according to claim 13, further comprising a step of accepting or rejecting the fowl based on the position captured by the computer vision system.

15. The method according to claim 13, further comprising a step of reorienting the fowl based on the position captured by the computer vision system.

* * * * *